Patented July 2, 1935

2,006,770

UNITED STATES PATENT OFFICE 2,006,770

ART OF ADHESIVELY JOINING METAL AND WOOD

Wilbur L. Jones, Madison, Wis., assignor to Roddis Lumber and Veneer Company, Marshfield, Wis., a corporation of Wisconsin No Drawing. Application February 4, 1933, Serial No. 655,253

4 Claims. (Cl. 154—40)

Composite panels or metal sheathed plywood for use in vehicle bodies, partitions, walls and construction of like character involve a core or body of fibrous material such as wood sheathed on one or both sides by sheet metal such as steel or aluminum.

The joining of the metal to the fibrous material such as wood involves problems which have been difficult to overcome owing to such factors as the poor adhesion to metal, brittleness of the bond between the wood and metal, lack of waterproof resistance of the bond, unequal stresses set up in the several laminations of the structure resulting from moisture, and changes in temperature.

The primary object of my invention is to overcome these difficulties by the provision of an improved bond by which the metal sheathings and the fibrous body of composite panels can be effectively joined by a bond which is moisture resistant, pliable to respond to intense unequal stresses, strongly adhesive and permanent in character.

Other objects of my invention will appear hereinafter.

In carrying out my invention, I provide between the surfaces of the metal sheathing and the wood surface of the core or body of the panel, a bonding medium which possesses both the properties of adhesion and flexibility or elasticity. These properties are embodied in two distinct layers of material in intimate contact with the metal sheathing and wood body and with each other. The elastic portion of the bond is a compound or mixture of rubber latex and sodium silicate in which the latex provides the elastic properties and the sodium silicate strengthens the adhesive properties of the compound. The other layer or film of the bond is constituted by a suitable glue or other adhesive.

I have discovered that sodium silicate and rubber latex can be made to combine in such a way as to give a free-flowing, film-forming liquid, the highly desirable adhesive properties of the former being supplemented and improved by the waterproof elastic or flexible properties of the latter. A coating material is thus formed which owes its strength and adhesive effect to the sodium silicate which it contains and its permanence to its rubber content, since the rubber encloses the sodium silicate and protects it from the injurious effects of water and air.

I have found that fluid sodium silicate, with a silica-soda ratio of 3.0 to 3.25 and containing 26.4 to 31.5 per cent of $SiO_2$ and 8.9 to 10.5 per cent of $Na_2O$, added to rubber latex under certain conditions which I will describe, provides a desirable coating solution. In mixing these two liquids care is required on account of the possibility of "creaming". Sodium silicates contain some free alkali (namely, sodium hydroxide) and when sodium hydroxide is added to latex it promotes "creaming"—that is to say, the rubber particles rise to the top, affecting the homogeneity of the mixture and making it less effective for spreading or spraying purposes. The total amount of sodium silicate added must be controlled and it must not be present, even temporarily, in excess. Therefore, it is necessary that the sodium silicate be added to the latex, and not the latex to the silicate. The sodium silicate should be introduced little by little, and the mixture should be stirred constantly, though not violently. The temperature of the ingredients and of the mixture should preferably be kept at 20 to 25 degrees C., since at higher temperatures the mixture "creams" and is unsuitable for making coatings. If the process is carried out in hot weather, it may be necessary to dilute the sodium silicate with water or add stabilizers in order to prevent "creaming". If the mixture is to be exposed to the air for some time, as in a spreading machine or a sprayer, it will be necessary to add water anyway in order to furnish the right consistency and guard against the effect of evaporation.

In making the coating mixture it is important to use the type of sodium silicate mentioned, for if a more alkaline silicate is used "creaming" may result while if a more silicious silicate is used the coating may be deficient in adhesiveness. The following formulæ illustrate solutions or mixtures which have given successful coatings on metal:

Formula No. 1

4.7 lbs. latex (60% rubber content)
5.6 lbs. sodium silicate.

A thinner and more stable solution can be prepared by adding a little water, preferably to the sodium silicate, thus:

Formula No. 2

4.7 lbs. latex (60% rubber content)
4.2 lbs. sodium silicate
2.0 lbs. water.

It is understood, of course, that these formulas can be varied to some extent and still give the kind of metal coating solution which I regard as coming within the scope of my invention. Also, I may add various substances in order to stabilize the mixture or give it some special characteristic. Thus, in order to increase the strength of the film, for example, I may incorporate a small amount of casein dissolved in borax or other solution, as indicated in the following formula:

*Formula No. 3*

4.7 lbs. latex (60% rubber content)
4.2 lbs. sodium silicate
.03 lbs. borax
1.7 lbs. water
.27 lbs. casein.

Or, instead of casein solution, I may use an appropriate amount of rosin size, which I have found to be an excellent stabilizer. If desired a small amount of ammonium chloride may be added in order that the ammonia content of the preserved latex may be maintained by a double decomposition involving the sodium hydroxide in the sodium silicate. I have also found that other stabilizers may be added and also fillers, vulcanizers and accelerators. In fact a regular vulcanized latex, such as that marketed under the trade-mark Vultex, may be used satisfactorily as the basis of my coating solution. Although rubber latex is referred to specifically, I am aware that there are other latices having characteristics and properties similar to rubber latex which will serve almost as well in metal coating work. I have experimented with milkweed latex, for example, and have found that it may be a substitute for rubber latex.

Having described the preparation of the elastic or flexible coating solution, I will now explain how it is used in the gluing of metals. Galvannealed iron and polished aluminum may be taken as examples of dull and bright metals, respectively.

Galvannealed iron is a galvanized iron, the surface of which has been dulled and made receptive to glues and paints by a special trade process. The problem in gluing galvannealed iron is not how to obtain strong adhesion, but how to prevent the adhesive from stripping the zinc coating off the sheet iron base when severely stressed. This is done by coating the galvannealed iron with a film or layer of latex sodium silicate solution hereinbefore described. This latex-sodium silicate may be applied to the metal in any way that is convenient, such as by brush, machine spreader, or spray. In fact, it is quite feasible to convey the latex and the sodium silicate by separate sprays, causing them to unite in the air or on the metal sheet. After the galvannealed iron sheet has been spread or sprayed on one side, the coating is allowed to form a film by drying.

Aluminum is an example of metal difficult to glue because of the stubbornness with which it retains oil and grease, because its polished surface affords no foothold for the adhesive, and because its wettability is poor. Aluminum has a remarkable attraction for oil and grease, which it usually carries in a thin film. This film makes it water-repellent, hence glue-repellent. An extra step therefore is necessary in order to destroy this grease film and dull or roughen the metal for gluing purposes. This is sometimes done by mechanical means, as with a scratch brush, but I have found that chemical means, such as a solution of sodium meta-silicate is exceedingly effective. For this purpose I dissolve 30 parts of sodium meta-silicate in 70 parts of water. It is effective for stubborn grease films. I have also used a solution of sodium silico-fluoride, which will corrode aluminum after it has been made wettable by treatment with a strong tri-sodium phosphate solution, but it is not quite as effective as sodium metasilicate.

In preparing the aluminum surface for gluing I simply apply the sodium metasilicate solution to the side of the sheet which is to be glued. A chemical reaction starts promptly; gas is evolved, a crust of powdery film is left, and the aluminum is found to have been corroded or etched. The crust or powdery film is now completely removed by gentle abrasion, with or without washing, and the metal is ready for the next step in the process.

The etched or corroded side of the aluminum sheet is then coated with a latex-sodium silicate solution hereinbefore described. The coating solution may be applied by spreading, spraying, or by any other means that is convenient. The preceding treatments might be combined—that is to say, the aluminum might be corroded and coated in one operation. This can be done through the use of a highly alkaline latex-sodium silicate mixture; but since such a mixture would be likely to "cream" readily, it is preferable to corrode and coat in two separate operations.

After the metal surface has been treated with a latex-sodium silicate solution as above described the coating is allowed to dry and form a film or layer. This film can, if desired, be vulcanized by heating either before or after the glue or adhesive layer is applied.

The metal sheathing having now been prepared by a film or coating of latex-sodium silicate material which in the finished product forms the elastic portion of the bond, the next step is to provide the adhesive portion of the bond. This may be applied either to the wood surface or on flexible coating prior to assembling the metal and wood laminations of the panel. Any suitable adhesive may be used, but a water-resistant adhesive, such as casein, blood albumen, or artificial resin glue, is preferable because more permanent.

After the surfaces have been thus treated with the layers or film of elastic material and adhesive, the sheet metal and wood laminations are superimposed one upon the other, the assembly is subjected to pressure and sometimes heat in the usual manner of composite panel manufacture.

It will be apparent that changes may be made in the method and arrangement of parts and materials without departing from the spirit of my invention, and it is to be understood that I contemplate such changes as fairly fall within the scope of the appended claims.

I claim:—

1. The method of joining together sheet metal and fibrous bodies in the manufacture of composite panels which consists in applying to the metal surface a coating of a mixture of rubber latex and sodium silicate, permitting said mixture to dry; applying a coating of glue to the previously applied coating; superimposing the metal sheet on the fibrous body and subjecting the assembly to pressure.

2. The method of preparing the surface of metal to be joined by a glue or other suitable adhesive to fibrous bodies such as wood, which consists in applying to said metal surface a coating of a mixture of latex and sodium silicate, and drying said coating before applying the adhesive.

3. The process of gluing aluminum to wood which consists of treating the surface of the metal with sodium metasilicate solution, removing the reaction residue, and coating said treated surface with a mixture of rubber latex and sodium silicate, interposing a coating of glue between the latex and sodium silicate mixture and the wood surface, and pressing said metal and wood into intimate relation.

4. A composite panel comprising a sheet of metal and a fibrous lamination superimposed one upon the other and having therebetween an adhesive bond securing said laminations together said adhesive bond comprising a layer of a mixture of latex and sodium silicate and a layer of glue.

WILBUR L. JONES.